No. 792,752. PATENTED JUNE 20, 1905.
F. & F. A. BLOCKI.
ATTACHMENT FOR MOWERS.
APPLICATION FILED NOV. 23, 1904.
2 SHEETS—SHEET 1.
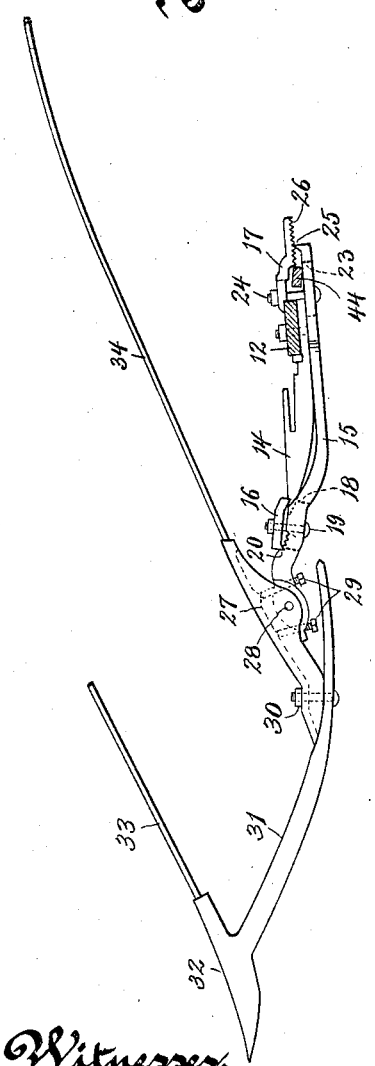
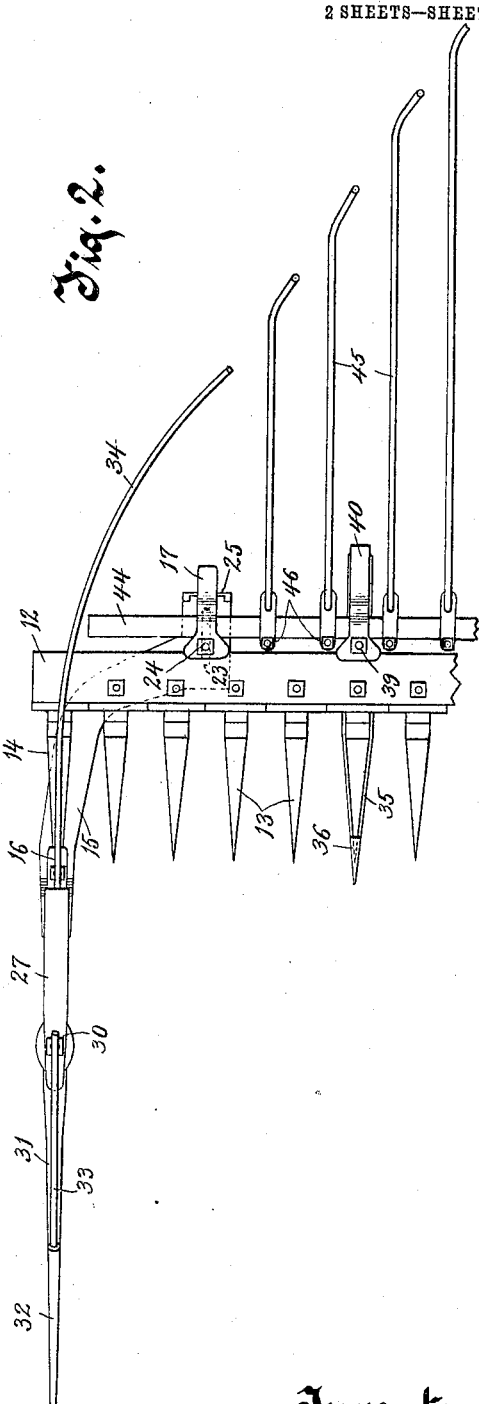
Witnesses.
C. H. Keener
R. S. C. Caldwell.
Inventors.
Franz Blocki
Frank A. Blocki
By Benedict & Morsell
Attorneys.

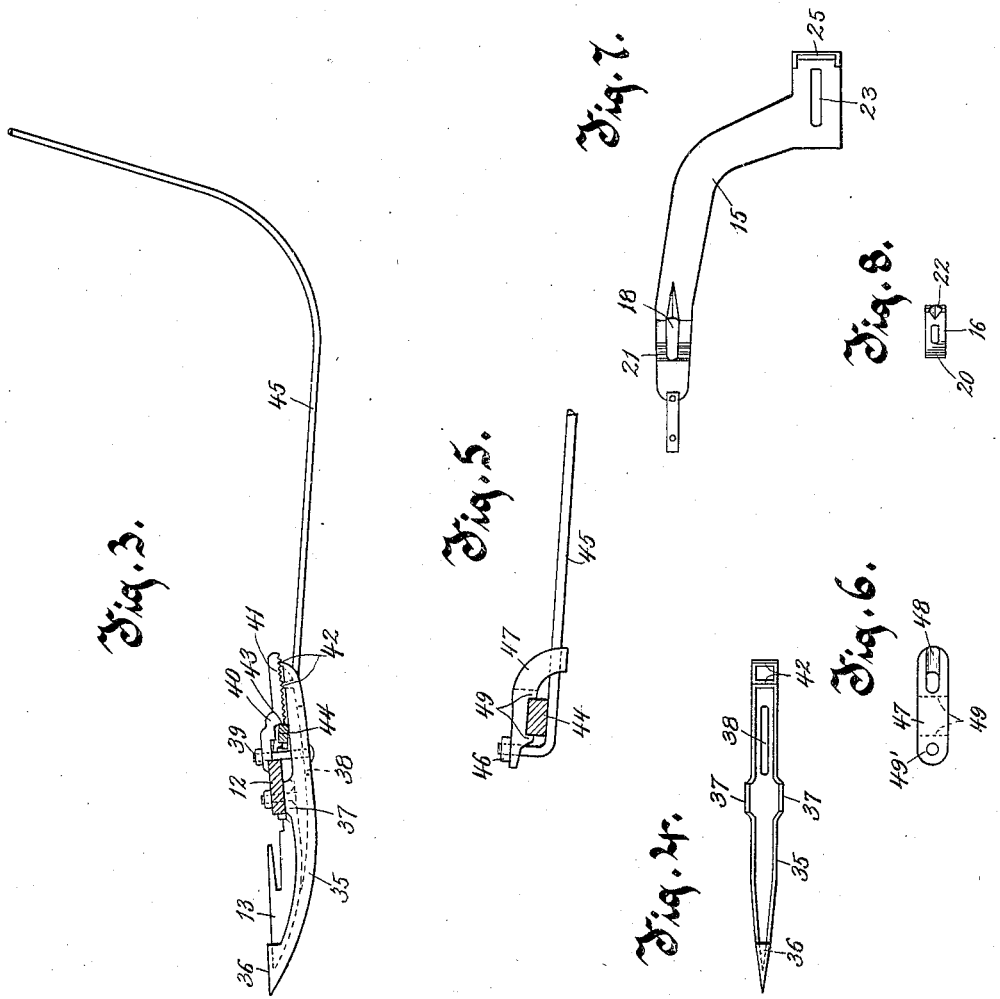

No. 792,752.

Patented June 20, 1905.

UNITED STATES PATENT OFFICE.

FRANZ BLOCKI AND FRANK A. BLOCKI, OF SHEBOYGAN, WISCONSIN.

ATTACHMENT FOR MOWERS.

SPECIFICATION forming part of Letters Patent No. 792,752, dated June 20, 1905.

Application filed November 23, 1904. Serial No. 233,929.

*To all whom it may concern:*

Be it known that we, FRANZ BLOCKI and FRANK A. BLOCKI, residing in Sheboygan, in the county of Sheboygan and State of Wisconsin, have invented new and useful Improvements in Attachments for Mowers, of which the following is a description, reference being had to the accompanying drawings, which are a part of this specification.

This invention relates to attachments for mowers, and has for its object to provide a means for securing trailing side-delivery fingers to the cutter-bar of a mower, so that the cut crop may be delivered in a windrow in the rear of the machine on one side of the swath.

Another object of this invention is to provide a divider which is adapted to be fastened to the outside shoe of a mower and is capable of adjustment to fit different-sized shoes, as well as being capable of adjustment to enable it to extend in the direction of travel of the machine.

Another object is to provide a divider attachment of such a construction that, besides serving as a divider, it supports the uncut crop.

Another object of the invention is to provide a divider attachment in combination with a side-delivery mechanism and of such a construction that it will conduct the cut crop onto the side-delivery mechanism.

Another object of the invention is to produce novel attaching and adjusting means for the several features above mentioned.

With the above and other objects in view the invention consists in the devices, their parts and combinations of parts, as herein set forth, and their equivalents.

Referring to the accompanying drawings, in which like characters of reference indicate the same parts in the several views, Figure 1 is a side elevation of a divider attachment constructed in accordance with this invention and connected to an end shoe of a cutting mechanism. Fig. 2 is a plan view thereof with a side-delivery mechanism also constructed in accordance with this invention. Fig. 3 is a side elevation of the side-delivery-mechanism-attaching means shown in Fig. 2. Fig. 4 is a plan view of the arm for connecting the side-delivery mechanism to the cutting mechanism. Fig. 5 is a side elevation of one of the side-delivery fingers with its clip connecting it to the cross-bar. Fig. 6 is a plan view of the clip. Fig. 7 is a plan view of the arm for connecting the divider attachment to the cutting mechanism, and Fig. 8 is an inverted plan view of the clamp-plate for connecting said arm to the outside shoe of the cutting mechanism.

In the drawings, 12 represents the cutter-bar of an ordinary cutting mechanism for mowers and the like, having the usual guard-fingers 13 and the outside shoe 14, with which the cutter-blades of a sickle-bar (not shown) are adapted to coöperate in the usual manner.

An angular arm 15 is provided with a clamp-plate 16 to engage the pointed front end of the outside shoe 14 of the cutting mechanism, and by reason of its angular bend it extends toward the machine proper beneath the cutter-bar to the rear thereof at a considerable distance nearer to the machine proper than the outside shoe 14, where it is clamped, by means of a clamp-plate 17, to the cutter-bar 12. At an upwardly-bent portion of the arm 15, where the clamp 16 is located, said arm is provided with an elongated slot 18, as shown in Fig. 7, into which the pointed end of the end shoe 14 is inserted, and a bolt 19, passing through the clamp-plate 16, has a movement through the slot 18 to move the clamp-plate 16, so as to engage the outside shoe 14 nearer to or farther from the pointed end thereof and to engage outside shoes 14 of different sizes. The clamp-plate 16 at its front end is provided with a downwardly-extending spur 20, which is adapted to engage in any one of a series of notches 21, formed in the arm 15, to hold the clamp-plate 16 in its adjusted position, and the rear end of said clamp-plate is bent downwardly and provided with an angular notch 22, as best seen in Fig. 8, to engage the front end of the outside shoe 14.

The rear end of the arm 15 has an elongated slot 23 therein, as best seen in Fig. 7, through which a bolt 24 passes and engages with the front end of a clamp-plate 17, which is shouldered to engage the rear edge of the cutter-bar 12. Beyond the slot 23 said arm is provided with an upwardly-extending knife-edge 25, which is adapted to engage any one of a series of teeth 26 in the under side of clamp-plate 17, so that said clamp-plate may be moved forwardly or rearwardly to enable it to clamp the cutter-bars of different machines by the bolt 24 sliding in the elongated slot 23, and the engagement between the knife-edge 25 and the teeth 26 will hold said clamp in its adjustments. The arm 15 may thus be held tightly to the cutting mechanism by the clamp-plate 16 engaging the outside shoe 14 and the clamp-plate 17 engaging the cutter-bar 12, and as the point of engagement of the clamp-plate 17 with the cutter-bar 12 may be made nearer to or farther from the outside shoe 14 the angle of direction of the front end of arm 15 with relation to the cutter-bar may be changed at will to adapt the divider attachment to machines of different construction.

The front end of arm 15 is flattened vertically to extend within a slot in the under portion of an inclined divider 27, which is pivoted thereto at 28 and is adapted to have its position with relation to the arm 15 adjusted and fixed by means of set-screws 29, threaded through the arm 15 and bearing on the divider within the slot. The lower forwardly-bent end of the divider 27 has secured to it, by means of a bolt 30 or otherwise, a curved runner 31 of an extension 32, which is pointed and is held up from the ground a considerable distance by said runner portion 31 extending beyond its connection with the divider 27 and bearing upon the ground. A divider-arm 33 extends upwardly and rearwardly from the inclined extension 32 and serves to divide the crops some distance ahead of the cutting mechanism, while a trailer-rod 34, which extends upwardly and rearwardly from the divider 27, continues to support the uncut crop to hold it away from the cutting mechanism and at its rear portion bends toward the machine proper to guide the cut crops into the side-delivery mechanism.

In order that the side-delivery mechanism may be secured to the cutting apparatus, a means is provided for engaging some of the guard-fingers 13. As here shown, this means comprises an arm 35 in the form of a shoe or runner, concavo-convex in cross-section, which fits beneath the guard-finger 13 and has a pocket 36 at its pointed front end to receive the pointed front end of the guard-finger 13, while at its middle portion it is provided with an upwardly-extending bearing-lug 37 on each side to bear on the under side of the cutter-bar 12. The arm 35 is provided with an elongated slot 38 behind the lugs 37, through which movably passes a bolt 39, having a clamp-plate 40 thereon. The clamp-plate 40 corresponds in shape and function to the clamp-plate 17, before described, and is adapted to have the series of rack-teeth 41 on the under side of its rear portion engaged by a pair of knife-edges 42, extending across the rear end of the arm 35 and projecting upwardly therefrom. By means of the clamp-plate 40 the arm 35 may be securely clamped to the cutting mechanism, and as said clamp-plate may be adjusted forwardly or rearwardly by moving the bolt 39 through the slot 38 it is adapted to clamp cutting mechanism of different sizes, the engagement of the knife-edges 42 with the teeth 41 securing the clamp-plate in its adjusted positions.

The arms 35 are arranged at convenient intervals along the cutting mechanism, and bent portions of their clamp-plates 40 form openings 43 between the clamp-plates 40, the bolts 39, and the upper portion of the arms 35, through all of which a cross-bar 44 passes from near one end of the cutter-bar to near the other end thereof and parallel therewith, and also having the same relation with the corresponding part of the divider-arm connection. A series of side-delivery fingers 45 are secured to the cross-bar 44 by each having its front end turned upwardly at right angles, with a nut 46 threaded thereon to clamp a clip 47 against the cross-bar 44, which passes between the finger 45 and the clip 47, said clip having a longitudinal slot 48 through its rear end, through which the approximately horizontal portion of the finger 45 passes. The clip 47 has a pair of opposite shoulders 49, between which the cross-bar 44 fits, while its front end is provided with a perforation 49' to receive the upright bent end of the side-delivery finger. As the cross-bar 44 has the finger 45 beneath it and the clip 47 above it and the clip is engaged with the finger by the finger passing through the slot 48 thereof, the tightening of the nut 46 serves to tightly clamp the cross-bar 44 between the clip and finger and securely hold the finger in place thereon. The slot 48 of clip 47 extends through a bend of the clip, so that its end walls are practically at right angles to each other to facilitate the passing of the angular bend of finger 45 therethrough. The side-delivery fingers 45 are arranged on the cross-bar 44 at regular intervals, and extending rearwardly of the cutting mechanism they bear on the ground with their rear ends bent upwardly and toward the machine proper. Each finger is slightly shorter than the next finger nearer the mechanism proper, so that the bent-up portions of the several fingers form a cradle extending at an angle to the cutter-bar and adapted by the forward movements of the machine to shift the cut crop to one side of the swath behind the machine proper in a windrow. The curvature of the trailer-rod 34 of the divider serves to guide the cut crop into this side-delivery mechanism.

From the foregoing it will be seen that the construction of the divider-arm 15, with its clamps 16 and 17, is such that it may be readily attached to the outside shoe of cutting mechanisms of different construction, and notwithstanding the differences of the conditions to be met with in the different forms of cutting mechanisms the divider may be adjusted to extend in the line of travel of the machine. The divider extension 32 may also be adjusted to different positions for different crops and different machines by means of the set-screws 29. The divider-rod and leader-rod serve to divide and support the crops, holding the uncut crops away from the cutting mechanism and leading the cut crops to the side-delivery mechanism.

The means for connecting the side-delivery mechanism with the cutting mechanism affords a secure connection with free pivotal movement of the side-delivery mechanism, so that it may always bear upon the ground, and is adapted for connection with various sizes and types of cutting mechanism.

The clip employed for connecting the fingers 45 with the cross-bar 44 affords a strong and quickly-applied clamping means of novel construction.

It is obvious that many changes may be made in the minor details of construction and arrangement of parts here shown and described without departing from the spirit and scope of the invention as defined by the claims.

What we claim as our invention is—

1. An attachment for a cutting mechanism comprising a cross-bar having means for connecting it to the cutting mechanism, a side-delivery finger having its front end bent at an angle, a clip having a slot in one end through which the finger passes and a hole in the other end through which the bent end of the finger passes whereby it is adapted to hold the cross-bar between it and the finger, and a nut threaded on the bent end of the finger to clamp the cross-bar between the clip and the finger.

2. In combination, a cross-bar, a finger having its end bent at an angle, a clip having a slot in its end through which the bent end of the finger passes, shoulders on the clip to receive the cross-bar, the bent end of the finger passing through an opening in the clip, and a nut threaded thereon to clamp the cross-bar between the clip and the finger.

3. An attachment for a cutting mechanism comprising a shoe-shaped arm having a pocket at its front end to receive the front end of a guard-finger of a cutting mechanism, a knife-edge on the rear end of the arm, a bolt slidable in a longitudinal slot of the arm, and a clamp-plate mounted on the bolt having a series of rack-teeth to engage with the knife-edge of the arm in different positions of the clamp-plate so that the clamp-plate may be adjusted lengthwise of the arm in order to engage the clamp-plate with the cutter-bar for clamping said cutter-bar.

4. An attachment for a cutting mechanism comprising a shoe-shaped arm having a pocket to receive the pointed front end of a guard-finger of a cutting mechanism, side lugs on the arm to bear on the cutter-bar of the cutting mechanism, a knife-edge on the rear part of the arm, a bolt slidable in a longitudinal slot of the arm, an angular clamp-plate on the bolt having a series of ratchet-teeth to engage the knife-edge at the different longitudinal adjustments of the clamp-plate produced by the sliding of the bolt in the longitudinal slot to permit the clamp-plate to engage and clamp the cutter-bar, said clamp-plate by its angular portion forming an opening between it and the arm, a cross-bar passing through said opening, a series of side-delivery fingers having angularly-bent ends, clips having slots in their ends to pass over the angularly-bent ends of the side-delivery fingers, said clips being provided with shoulders to engage the cross-bar and with openings to receive the bent ends of the side-delivery fingers, and nuts threaded on the bent ends of the side-delivery fingers to clamp the side-delivery fingers to the cross-bar.

In testimony whereof we affix our signatures in presence of two witnesses.

FRANZ BLOCKI.
FRANK A. BLOCKI.

Witnesses:
 FR. NAGEL,
 HENRY F. NAGEL.